(12) United States Patent
Parrish et al.

(10) Patent No.: US 6,899,113 B2
(45) Date of Patent: May 31, 2005

(54) PRESSURE RELIEF VALVE

(75) Inventors: Thomas A. Parrish, Parma, MI (US); Kenneth G. Phaneuf, Chelsea, MI (US); Bernardino P. Nanni, Jr., Jerome, MI (US)

(73) Assignee: Eaton Corporation, Cleveland, OH (US)

( * ) Notice: Subject to any disclaimer, the term of this patent is extended or adjusted under 35 U.S.C. 154(b) by 42 days.

(21) Appl. No.: 10/222,287

(22) Filed: Aug. 16, 2002

(65) Prior Publication Data

US 2004/0031526 A1 Feb. 19, 2004

(51) Int. Cl.[7] .............................................. F16K 21/10
(52) U.S. Cl. .................. 137/1; 137/15.18; 137/315.27; 137/514; 137/514.3; 137/536; 251/337
(58) Field of Search .................... 137/1, 15.18, 315.27, 137/315.33, 514.3, 514.5, 536, 540, 551, 542, 543.13, 514; 251/337, 48

(56) References Cited

U.S. PATENT DOCUMENTS

| | | | | |
|---|---|---|---|---|
| 1,377,199 A | * | 5/1921 | Granby | 137/542 |
| 1,960,272 A | * | 5/1934 | Lovekin | 137/73 |
| 2,740,425 A | * | 4/1956 | Garland | 137/543.13 |
| 3,084,710 A | * | 4/1963 | Gondek | 137/514 |
| 3,550,617 A | * | 12/1970 | Johnson | 137/514.5 |
| 3,626,976 A | * | 12/1971 | Kraakman | 137/488 |
| 3,796,228 A | * | 3/1974 | Bedo et al. | 137/536 |
| 4,336,826 A | * | 6/1982 | Grawunde | 137/540 |
| 5,603,348 A | * | 2/1997 | Geringer | 137/514.7 |
| 5,678,604 A | * | 10/1997 | Plauborg et al. | 137/514.7 |
| 5,871,109 A | * | 2/1999 | Litten | 213/43 |
| 5,927,323 A | * | 7/1999 | Kikuchi et al. | 137/514.5 |
| 6,532,987 B1 | * | 3/2003 | Itoh et al. | 137/514.5 |

* cited by examiner

*Primary Examiner*—Ramesh Krishnamurthy
(74) *Attorney, Agent, or Firm*—Honigman Miller Schwartz and Cohn LLP

(57) ABSTRACT

A pressure relief apparatus including a housing, a valve disposed in the housing, the valve having a first shoulder, a retainer disposed between the housing and the valve spool, the retainer having a second shoulder, a biasing member disposed between the first and second shoulders, and a metallic seal interface between the housing and the valve. The valve may be constructed with no dynamic elastomeric seals to reduce hysteresis.

39 Claims, 2 Drawing Sheets

PRESSURE RELIEF VALVE

FIELD OF THE INVENTION

The present invention related to overpressure protection devices. More particularly, the present invention is directed to a pressure relief valve.

BACKGROUND OF THE INVENTION

Current practice in the field of fluid distribution systems is to rely on direct acting or pilot operated pressure relief valves to avoid excess pressure developing within a system, thereby exposing attached components to damaging overpressures. Relief valves are normally connected in the system so that they discharge fluid to waste or a lower pressure zone when the system pressure exceeds a predetermined set point pressure.

Direct acting relief valves rely on a valve member that is exposed to an opening force created by the pressure of the fluid distribution system and a closing force created by a spring. If the pressure of the distribution system (the opening force) exceeds the closing force established by the spring, the valve will open to release fluid and relieve pressure until the spring force is sufficient to close the valve. Sometimes a dashpot is used to reduce fast closing or slamming of the valve.

Direct acting relief valves offer the advantages of opening quickly and being useable in both clean and dirty fluid distribution systems. At the same time, such valves currently suffer from the disadvantage that once open, the valves often do not close again until the system pressure has decreased significantly—usually well below the established overpressure limit. The lag time between the opening and the closing of the valve sometimes results in significant fluid loss. The lag is primarily due to the presence in typical pressure relief valves of elastomeric seals between the valve body and the valve actuator. The elastomeric seals are normally very tightly fit to prevent leakage, but a tight seal contributes to valve hysteresis. In highly sensitive applications, such as aerospace applications, in addition to fluid loss the relief valve lag may also cause valve chatter, unwanted vibrations, and unacceptable pressure fluctuations.

As an alternative, sometimes pilot operated relief valves are used to relieve overpressures in the fluid distribution system. Pilot operated valves employ a small direct acting valve to control a larger diaphragm or piston operated main relief valve. The pilot operated valves require needle valves, strainers or filters in the pilot circuit. This characteristic makes them suitable for clean applications, but inappropriate for dirty systems handling particulate material that can clog the pilot circuit.

Pilot operated relief valves also suffer from the disadvantage of relatively slow reactions to overpressure conditions. Because pilot operated valves have to release fluid from a control chamber through tubing and the pilot valve itself, several seconds may be required for the valve to open fully. Booster valves may be used to speed opening, but the time delay may still be too long to suit the operating specifications of the fluid distribution system.

Further, most pressure relief valves are difficult or impossible to adjust for changing applications. Some systems have changing overpressure parameters because of the use of a single apparatus for many different processes. Current pressure relief valves make the use of overpressure systems on apparatus with varying overpressure requirements difficult to maintain.

The present invention is directed to eliminating, or at least reducing the effects of, one or more of the problems described above.

SUMMARY OF THE INVENTION

The present invention meets the above-described needs and others. Specifically, the present invention provides a pressure relief apparatus including a housing, a valve disposed in the housing, the valve having a first retaining surface, a retainer disposed between the housing and the valve spool, the retainer having a second retaining surface, a biasing member disposed between the first and second retaining surfaces of the retainer and the valve, and a metallic seal interface between the housing and the valve.

The present invention also provides a pressure relief apparatus including a housing, a movable valve spool disposed in the housing, a retainer radially disposed between the housing and the valve spool, and a biasing member disposed in an annulus between the retainer and the valve spool.

The present invention also provides a method of adjusting a pressure relief valve spring force installed in a system fluid including partially separating an end cap and retainer from a housing, uncovering an retainer adjustment member, and moving the retainer with respect to the end cap to increase or decrease the spring force, where the separating, uncovering, and moving is accomplished without exposing the system fluid.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Figure 1:
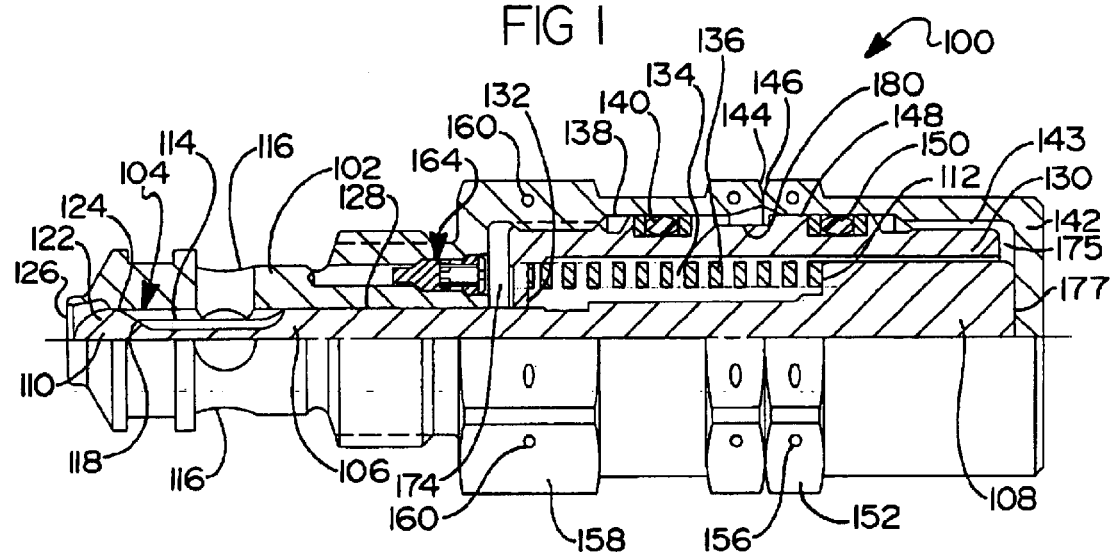
FIG. 1 is partial cross-sectional view of pressure relief valve according to one embodiment of the present invention.

In the drawings, identical reference numbers indicate similar, but not necessarily identical, elements. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Illustrative embodiments of the invention are described below. As will be appreciated by those skilled in the art, the present invention can be implemented in a wide variety of applications. The applications include, but are not limited to, military, industrial, aerospace, automotive, or chemical systems and environments.

Turning now to the figures, and in particular to FIG. 1, one embodiment of a pressure relief apparatus (100) according to the present invention is shown. The pressure relief apparatus (100) includes a housing (102) for containing components of the apparatus. The housing (102) of the present embodiment is made of structural materials such as 17–4 stainless steel, however, other structural materials may also be used. Stainless steel may be especially useful in aggressive environments and for aerospace applications.

Disposed in the housing (102) is a valve, for example a sliding valve (104). The sliding valve (104) includes a spool (106) with first and second ends (108 and 110). The first end (108) includes a first retaining surface, for example a shoulder (112), where the diameter of the spool (106) increases. The second end (110) includes a fluted portion (114) for allowing fluid to communicate through a plurality of holes (116) in the housing (102). In the present embodiment, the fluted portion (114) includes three milled sections (120) as more clearly depicted in FIG. 2. The second end (110) of the spool (106) also includes a head (122) that engages a seat (124) of the housing (102) in a closed position as shown. The housing (102) includes an opening (126) for allowing the passage of fluids through the fluted portion (114) when the sliding valve (104) is in an open position. In FIG. 1, the sliding valve (104) is shown in a closed position.

The spool (106) of the present embodiment is made of an application-compatible material, for example 06 carbon steel or other tool steel. However, the thermal properties of the spool (106) material are the same as those of the housing (102) (in the present embodiment 17–4 stainless steel) for the present embodiment. The matching thermal properties of the materials of the housing (102) and the spool (106) ensure that a metallic interface seal (128) between the housing (102) and the spool (106) is maintained within a very close tolerance. In some embodiments, the clearance between the housing (102) and the spool (106) is maintained between about 0.00001 and 0.0001 inches, and preferably about 0.00005 inches. The small clearance between the housing (102) and the spool (106) advantageously create the metallic interface seal (128) without the typical dynamic elastomeric seals found in other pressure relief valves. The elimination of any dynamic elastomeric seals according to the present invention reduces the spool (106) response time to pressure changes the pressure relief valve (100) is exposed to. In addition, because there are no dynamic elastomeric seals, the reliability of the pressure relief valve (100) is increased. The increase in reliability is, at least in part, a result of the elimination of dynamic elastomeric seals that tend to wear and eventually fail in typical pressure relief valves. An effective pressure area (177) at the first end (108) of the spool (106) provides a surface for fluid pressure to act against to move the spool (106) in overpressure conditions.

Arranged between the spool (106) and the housing (102) at the first end (108) of the spool (106) is a retainer (130). The retainer (130) is threaded to match mating threading along the interior of the housing (102). The retainer (130) may be made of 17–4 stainless steel or other material structurally and thermally compatible with the other relief valve (100) components. The retainer includes a second retaining surface, for example a second shoulder (132) substantially parallel to and spaced from the first shoulder (112) of the spool (106). The second shoulder (132) of the retainer (130) and the first shoulder (112) of the spool (106) create a cavity (134) between the spool (106) and the retainer (130). The cavity is receptive of a biasing member, for example a spring (136) that may be compressed between the first and second shoulders (112 and 132) as the retainer (130) is threadingly engaged with an end cap (142). The spring (136) applies a force to the first and second shoulders (112 and 132) that biases the spool (106) to the closed position shown in the figure. The force provided by the spring (136) may be advantageously adjusted by rotating the retainer (130) relative to the end cap (142). The force applied by the spring may be increased by rotating the retainer (130) in a first direction (in the present embodiment clockwise) tending to insert the retainer (130) further into the end cap (142). Likewise, the force may be decreased by rotating the retainer (130) in a second direction (in the present embodiment counter-clockwise) tending to withdraw the retainer (130) from the end cap (142). Because the force exerted by the spring (136) is adjustable, the spring (136) may be specified within a wider range of tolerances than previous valve designs. Springs with wider tolerance ranges are typically less expensive than those requiring more precise tolerances, and therefore the pressure relief valve (100) according to the present embodiment may be produced at a lower cost than previous valves. The retainer (130), spool (106), spring (136) and end cap (142) are mated together as a subassembly in some embodiments before connecting the retainer (130) to the housing (102). A second cavity (175) is disposed between the first end (108) of the spool (106) and the end cap (142) according to the present embodiment.

The housing (102) may include a nut, for example a hexagonal nut (158 about its circumference to facilitate the use of a tool to connect the housing (102) to the retainer (130). The hexagonal nut (158) may include one or more holes (160) receptive of a locking wire (154, FIG. 4) which is discussed in more detail below with reference to FIG. 4.

According to the embodiment of FIG. 1, an annulus (138) between the retainer (130) and the housing (102) is sealed by a first static elastomeric packing or o-ring (140). The o-ring (140) may be made of nitrile rubber or other elastomeric materials.

In addition to compressing the spring (136) with the retainer (130), the end cap (142) encloses the spool (106) and the retainer (130) at the first end (108). The end cap (142) may be made of structural materials such as 17–4 stainless steel or other materials compatible with other valve (100) components. According to the embodiment of FIG. 1, the end cap (142) abuts the housing (102) in a fully threaded position. The end cap (142) is internally threaded to match mating threads along an exterior of the retainer (130). Because of the force supplied by the spring (136) between the end cap (142) and the retainer (130), once threaded to the retainer (130), the end cap (142), retainer (130), spring (136), and spool (106) tend to rotate together as single subassembly unit. The spring (136) applies force to the threading between the end cap (142) and the retainer (130), adding to the frictional engagement (in the illustrated embodiment a rotational friction) between mating threads of the end cap (142) and retainer (130). Accordingly, as there is less rotational friction between the threads of the retainer (130) and the housing (102) than there is between the retainer (130) and the end cap (142), rotating the end cap (142) tends to rotate the retainer (130) into or out of engagement with the housing (102). An annulus (148) between the end cap (142) and the retainer (130) is sealed by a second static elastomeric packing or o-ring (150). The o-ring (150) may be made of nitrile rubber or other elastomeric materials.

The end cap (142) may also include a nut, for example hexagonal nut (152) about its circumference to facilitate the use of a tool to connect the end cap (142) to the retainer (130). The hexagonal nut (152) may include one or more holes (156) receptive of a locking wire (154, FIG. 4), which is further discussed below with reference to FIG. 4.

According to the embodiment of FIG. 1, the housing (102) includes a check valve (164) buried within the housing (102) to advantageously reduce oscillatory movement of the spool (106) within the housing (102) in an overpressure environment. It is not uncommon for typical pressure relief valves to oscillate between open and closed positions (often referred to as "chatter") in overpressure situations. Chatter results from the release of fluid through the fluted area of the spool and into the lower pressure waste or exhaust area. When a relief valve opens and fluid flows there though, the local pressure is reduced, and the spool tends to close. As the valve tends to close, the local pressure quickly returns to the fluid apparatus pressure, tending to cause the spool to reopen. This cycle can repeat indefinitely during an overpressure situation and cause undesirable noise, wear, fatigue, and other problems. Therefore, in order to prevent or reduce this chatter, the valve (100) of the present embodiment includes the check valve (164). It will be understood by those of skill in the art having the benefit of this disclosure, however, that some embodiments of the present invention may not include the check valve (164). A detailed description of how the check valve (164) operates is discussed below with reference to FIG. 3.

Figure 2:
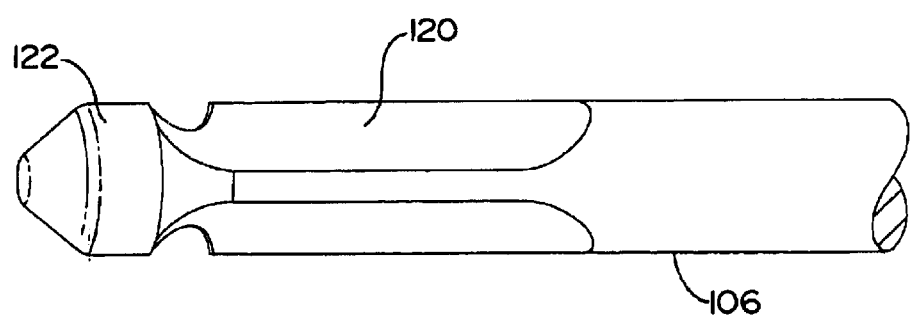
FIG. 2 is a perspective view of a component of the pressure relief valve shown in FIG. 1.

Referring next to FIG. 2, a detail of the valve spool (106) is shown. The detail of FIG. 2 shows the milled sections (120) and the head (122) of the spool (106). The head (122) of the spool (106) may be tapered as shown to facilitate the exit of fluids through the opening (126, FIG. 1) in the housing (102, FIG. 1) when the spool (106) is in an open position. The spool (106) may be milled or cut to the configuration shown, or to other fluted patterns. As mentioned above, the spool (106) may be constructed of materials compatible with the particular fluid system application.

Figure 3:
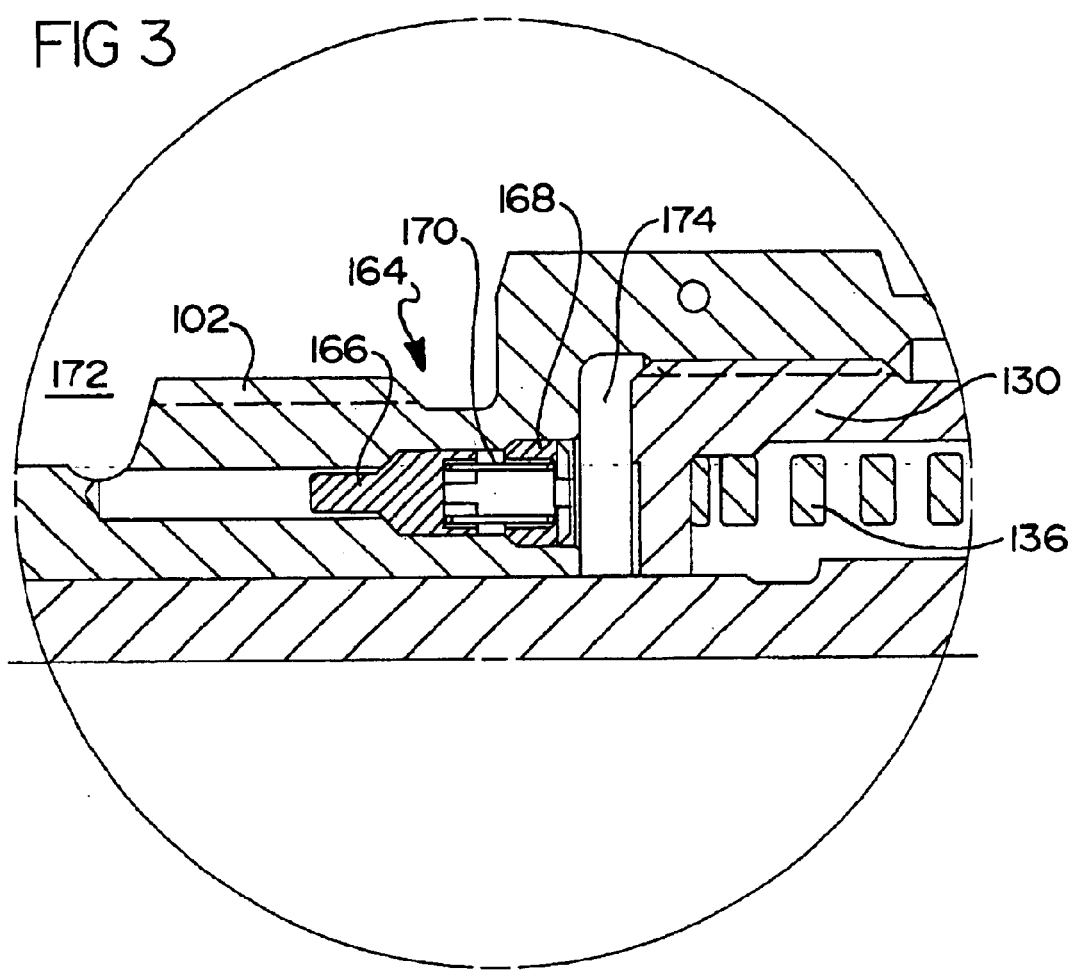
FIG. 3 is a detail of a check valve portion of the pressure relief valve shown in FIG. 1.

Referring next to FIG. 3, a detail of the check valve (164) is shown. The check valve (164) includes a poppet (166), a retainer (168), and a biasing member such as a spring (170) disposed between the poppet (166) and the retainer (168). The check valve (164) allows flow in only one direction, from the high pressure environment (172), to a first cavity (174) between the retainer (130) and the housing (102), and ultimately to the second cavity (175, FIG. 1) between the first end (108) and the end cap (142). The torturous path from the high pressure environment (172), through the first cavity (174), and eventually to the second cavity (175, FIG. 4) provides a dampening effect to pressure fluctuations. Further, as mentioned above, the introduction of the check valve (164) reduces or eliminates chatter. Chatter is reduced or eliminated by restricting the flow of fluid from the housing cavity (174) back to the high pressure environment (172) when the pressure local to the spool (106) decreases as a result of the relief valve (104, FIG. 1) opening. The relief valve (104, FIG. 1) tends to modulate in an attempt to maintain a preset pressure. This modulation can create a pressure pulsation in the high pressure environment (172). The check valve (164) allows immediate opening of the relief valve (104) in response to system overpressure, but slightly restricts the relief valve's reaction to under pressure. That is, the pressure relief valve (104) opens quickly, but is at least slightly slower to close. Thus, chatter is effectively reduced or eliminated while still allowing fast response to overpressure conditions.

Figure 4:
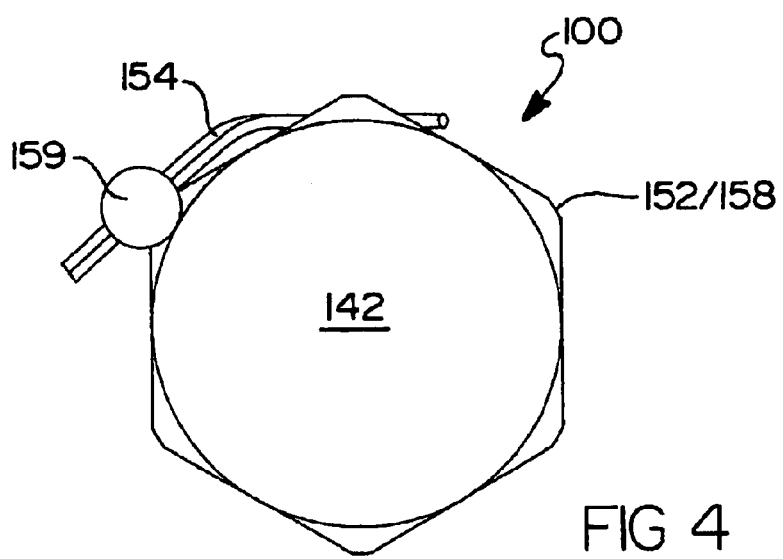
FIG. 4 is an end view of the pressure relief valve shown in FIG. 1.

Referring next to FIG. 4, an end view of the pressure relief valve (100) is shown according to a preferred embodiment of the present invention. As shown in FIG. 4, the end cap (142) includes the hexagonal nut (152) about its circumference to facilitate the use of a tool to connect the end cap (142) to the retainer (130, FIG. 1). The hexagonal nut (152) may also be receptive of the locking wire (154) extending through the one or more holes (156, FIG. 1) in the hexagonal nut (152) to prevent tampering with the end cap (142) once it is installed. A seal such as a crimped lead tag (159) may be added to the locking wire (154) as a tampering indicator. If the end cap (142) is adjusted or removed after installation, the crimped lead tag (159) will break, indicating that the end cap (142) has been adjusted or tampered with. The hexagonal nut (152) is also representative of the hexagonal nut (158) and associated wire of the housing (102) referred to above.

Returning now again to FIG. 1, assembly and operation of the pressure relief apparatus (100) is discussed. To assemble the pressure relief apparatus (100), the spring (136) and the spool (106) are inserted into the retainer (130). The spring is compressed and set to a desired force level as the retainer is threaded into the end cap (142). When the retainer (130) is threaded into the end cap (142) sufficiently to create the desired force level for the spring (136), the retainer (130) is threaded into the housing (102) and the pressure relief apparatus (100) is ready for insertion into a fluid apparatus. As mentioned above, the force of the spring (136) between the retainer (130) and the end cap (142) adds to the rotational friction between the two such that end cap (142) and retainer (130) tend to rotate together as the end cap is turned to thread the retainer (130) into the housing (102).

The pressure relief apparatus (100) may be inserted into a fluid apparatus for overpressure protection and exposed to the fluid pressure of the fluid apparatus. The fluid apparatus may include a chemical process, a fluid delivery system, or other apparatus. The fluid in the fluid apparatus passes by the check valve (164), into the first and second cavities (174 and 175), and acts on the effective piston area (177) of the spool (106). The fluid pressure also acts on the poppet (166) of the check valve (164). If the fluid pressure reaches a predetermined level necessary to overcome the force of the spring (136), the spool (106) will automatically "crack" open and allow fluid to pass through the fluted portion of the spool (106) and to a low pressure environment or waste container. For example, the spool (106) may crack open at a minimum of about 1355 to 1370 psi in some applications, allowing the passage of about 100 cubic centimeters of fluid per minute to pass through the valve (104). If fluid pressure continues to increase, the spool (106) may move to a full open position and allow more fluid to pass there through. According to the embodiment shown, the travel distance of the spool (106) from a closed to a full open position is approximately 0.01 to 0.1 inches, and preferably about 0.02 inches, but this distance may be adjusted. At the full open position, the valve (104) may, for example, allow the passage of fluid at a rate of ten gallons per minute (10 GPM). The full open position may be achieved, for example, when the fluid pressure reaches a maximum of about 1505 to 1525 psi. That is to say, that at least by the time fluid pressure reaches about 1525 psi, the valve is fully open (it may also be fully open prior to reaching 1505 psi). As the overpressure condition subsides, the valve may begin to close as the spool travels back toward the end cap (142). The valve may, for example, reduce the fluid flow there through to one gallon per minute when the fluid pressure reaches about 1300 to 1380 psi. Typically, such a flow reduction following an overpressure event is difficult to achieve with conventional pressure relief valves because of the difficulty of a spring in overcoming the friction of a dynamic elastomeric seal between a housing and a spool. Therefore, significant amounts of fluid are needlessly wasted as it flows through a conventional pressure relief valve.

However, the present invention has the advantage of no dynamic elastomeric seals such that the spring (136) can quickly cause the spool to move closed after an overpressure event. The quick closure reduces the fluid flow substantially even for small reductions in pressure (for example, a reduction from 1525 psi to just 1380 psi is sufficient according to the present embodiment to reduce the fluid flow from about ten gallons per minute to about one gallon per minute). In addition, the chatter typical of most pressure relief valves is significantly reduced and usually eliminated altogether by the introduction of the check valve (164).

Moreover, if the spring force provided by the spring (136) needs adjustment, it can be fine-tuned without breaking either of the static o-ring seals (140/150). In order to adjust the spring force, the end cap (142) and (because of the spring force) the retainer (130) are partially unscrewed (e.g. a couple of rotations) from the housing (102). As the retainer (130) is rotated out of the housing (102), a retainer adjustment member of the retainer (130) is exposed. In the present embodiment, the retainer adjustment member is a hexagonal surface (180). Once exposed, a wrench may be inserted between the housing (102) and the end cap (142) to engage the hexagonal surface (180) and hold the retainer (130) so that that the end cap (142) can be rotated with respect to the retainer (130) to adjust the spring force. Thus, by slightly unscrewing the end cap (142) and rotating the retainer (130) with respect to the end cap (142) with the aid of a wrench or other tool, the spring force can be adjusted without exposing the system fluid.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A pressure relief apparatus comprising:
   a housing;
   a valve disposed in the housing, the valve having a first retaining surface;
   a retainer radially disposed between the housing and the valve, the retainer having a second retaining surface;
   a biasing member disposed between the first retaining surface of the valve and the second retaining surface of the retainer;
   a metallic seal interface between the housing and the valve;
   an end cap abutting the housing and enclosing the retainer and the valve; and
   wherein the retainer comprises threading at a first end for engagement with mating threading of the housing and the retainer comprises threading at a second end for engagement with mating threading of the end cap.

2. The apparatus of claim 1, wherein the first and second retaining surfaces comprise shoulders, a cavity for retaining the biasing member defined there between.

3. The apparatus of claim 1, wherein the metallic seal interface contains no dynamic elastomeric seals.

4. The apparatus of claim 1, wherein the valve comprises a movable spool.

5. The apparatus of claim 4, wherein the movable spool comprises a fluted portion.

6. The apparatus of claim 4, wherein the movable spool is biased to a closed position by the biasing member.

7. The apparatus of claim 6, wherein the biasing member comprises a spring.

8. The apparatus of claim 4, wherein the movable spool and the housing comprise metal having generally matching thermal properties.

9. The apparatus of claim 1, wherein the retainer and the housing are threadingly connected.

10. The apparatus of claim 9, wherein a force from the biasing member is adjustable by rotating the retainer relative to the valve, thereby adjusting the displacement between the retaining surfaces.

11. The apparatus of claim 1, wherein a rotational friction between the threading of the retainer and the housing is less than a rotational friction between the threading of the retainer and the end cap.

12. A pressure relief apparatus comprising:
    a housing;
    a movable valve spool disposed in the housing;
    a check valve disposed in the housing for reducing valve chatter;
    a retainer radially disposed between the housing and the valve spool;
    a biasing member entirely disposed in an annulus between the retainer and the valve spool;
    an end cap covering first ends of the retainer and the movable valve spool; and
    wherein a biasing force is adjustable by adjusting the retainer with respect to the end cap.

13. The apparatus of claim 12, wherein the biasing member comprises a compression spring.

14. The apparatus of claim 13, wherein an interface between the housing and the spool contains no dynamic elastomeric seals.

15. The apparatus of claim 12, wherein the valve spool comprises a fluted portion.

16. The apparatus of claim 12, wherein the retainer comprises a first mechanism at a second end for adjustable engagement with the housing and a second mechanism at the first end for adjustable engagement with the end cap.

17. The apparatus of claim 12, wherein the retainer comprises threading at a second end for engagement with mating threading of the housing and wherein the retainer comprises threading at the first end for engagement with mating threading of the end cap, a rotational friction between the threading of the retainer and the housing being less than a rotational friction between the threading of the retainer and the end cap.

18. A pressure relief apparatus comprising:
    a housing;
    a movable valve spool disposed in the housing;
    a retainer radially disposed between the housing and the valve spool;
    a biasing member entirely disposed in an annulus between the retainer and the valve spool;
    an end cap covering first ends of the retainer and the movable valve spool; and
    wherein the retainer comprises a first mechanism at a second end for adjustable engagement with the housing and a second mechanism at the first end for adjustable engagement with the end cap, and wherein a compression spring force is adjustable by adjusting the retainer with respect to the end cap.

19. The apparatus of claim 18, wherein the first mechanism includes a first frictional engagement and the second mechanism includes a second frictional engagement, the first frictional engagement being less than the second frictional engagement.

20. The apparatus of claim 19, wherein the second mechanism includes the compression spring.

21. The apparatus of claim 18, wherein the retainer comprises threading at the second end for engagement with mating threading of the housing.

22. The apparatus of claim 21, wherein the retainer comprises threading at the first end for engagement with mating threading of the end cap.

23. A method of relieving fluid pressure comprising:
providing a valve housing;
compressing a spring within an annulus between a valve spool and a retainer within the valve housing, wherein compressing the spring comprises threading the retainer into an end cap;
setting the spring to provide a predetermined force to the valve spool;
inserting the valve housing into a fluid apparatus;
exposing the valve spool to a fluid pressure of the fluid apparatus;
automatically moving the valve spool to an open position when the fluid pressure on the valve spool exceeds the predetermined force; and
wherein an interface between the valve housing and the valve spool contains no dynamic elastomeric seals.

24. The method of claim 23, further comprising automatically moving the valve spool back to a closed position when fluid pressure on the valve spool recedes to a predetermined pressure.

25. The method of claim 23, further comprising attaching a lock wire to the housing to prevent tampering with the valve spool or retainer.

26. The method of claim 25, further comprising crimping a seal to the lock wire to indicate tampering.

27. The method of claim 23, further comprising adjusting the predetermined force by rotating the retainer into or out of the end cap.

28. The method of claim 23, further comprising reducing an oscillation of the valve spool within the valve housing.

29. The method of claim 28, wherein the reducing further comprising restricting a fluid flow path to one direction between the fluid pressure of the fluid apparatus and an annulus between the valve housing and the valve spool.

30. A pressure relief apparatus comprising:
a housing;
a movable valve spool disposed in the housing;
a retainer radially disposed between the housing and the valve spool;
a biasing member disposed in an annulus between the retainer and the valve spool;
an end cap covering first ends of the retainer and the movable valve spool; and
wherein a compression spring force is adjustable by adjusting the retainer with respect to the end cap;
wherein the retainer comprises a first mechanism at a second end for adjustable engagement with the housing and a second mechanism at the first end for adjustable engagement with the end cap.

31. The apparatus of claim 30, wherein the first mechanism includes a first frictional engagement and the second mechanism includes a second frictional engagement, the first frictional engagement being less than the second frictional engagement.

32. The apparatus of claim 31, wherein the second mechanism includes a compression spring.

33. The apparatus of claim 30, wherein the retainer comprises threading at the second end for engagement with mating threading of the housing.

34. The apparatus of claim 33, wherein the retainer comprises threading at the first end for engagement with mating threading of the end cap.

35. The apparatus of claim 30, wherein the retainer comprises threading at a second end for engagement with mating threading of the housing and wherein the retainer comprises threading at the first end for engagement with mating threading of the end cap, a rotational friction between the threading of the retainer and the housing being less than a rotational friction between the threading of the retainer and the end cap.

36. A pressure relief apparatus comprising:
a housing;
a valve disposed in the housing, the valve having a first retaining surface;
a retainer radially disposed between the housing and the valve, the retainer having a second retaining surface;
a biasing member disposed between the first retaining surface of the valve and the second retaining surface of the retainer;
an end cap abutting the housing and enclosing the retainer and the valve;
a metallic seal interface between the housing and the valve,
wherein the retainer comprises threading at a first end for engagement with mating threading of the housing, wherein the retainer comprises threading at a second end for engagement with mating threading of the end cap, and wherein a rotational friction between the threading of the retainer and the housing is less than a rotational friction between the threading of the retainer and the end cap.

37. A pressure relief apparatus comprising:
a housing;
a valve disposed in the housing, the valve having a first retaining surface;
a retainer radially disposed between the housing and the valve, the retainer having a second retaining surface;
a biasing member disposed between the first retaining surface of the valve and the second retaining surface of the retainer;
a metallic seal interface between the housing and the valve; and
a check valve disposed in the housing and providing a one-way fluid communication path between an external pressure environment and an annulus between the valve and the housing.

38. A pressure relief apparatus comprising:
a housing;
a movable valve spool disposed in the housing;
a retainer radially disposed between the housing and the valve spool;
a biasing member entirely disposed in an annulus between the retainer and the valve spool;

an end cap covering first ends of the retainer and the movable valve spool;

wherein a biasing force is adjustable by adjusting the retainer with respect to the end cap; and wherein the retainer comprises threading at a second end for engagement with mating threading of the housing and wherein the retainer comprises threading at the first end for engagement with mating threading of the end cap, a rotational friction between the threading of the retainer and the housing being less than a rotational friction between the threading of the retainer and the end cap.

39. A method of relieving fluid pressure comprising:

providing a valve housing;

compressing a spring within an annulus between a valve spool and a retainer within the valve housing;

setting the spring to provide a predetermined force to the valve spool;

inserting the valve housing into a fluid apparatus;

exposing the valve spool to a fluid pressure of the fluid apparatus; and automatically moving the valve spool to an open position when the fluid pressure on the valve spool exceeds the predetermined force;

reducing an oscillation of the valve spool within the valve housing by restricting a fluid flow path to one direction between the fluid pressure of the fluid apparatus and an annulus between the valve housing and the valve spool; and wherein an interface between the valve housing and the valve spool contains no dynamic elastomeric seals.

* * * * *